(12) United States Patent
Yin

(10) Patent No.: US 11,275,963 B2
(45) Date of Patent: Mar. 15, 2022

(54) IMAGE IDENTIFICATION APPARATUS, IMAGE IDENTIFICATION METHOD, AND NON-TRANSITORY COMPUTER-READABLE STORAGE MEDIUM FOR STORING IMAGE IDENTIFICATION PROGRAM

(71) Applicant: FUJITSU LIMITED, Kawasaki (JP)

(72) Inventor: Fang Yin, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/089,919

(22) Filed: Nov. 5, 2020

(65) Prior Publication Data

US 2021/0182591 A1    Jun. 17, 2021

(30) Foreign Application Priority Data

Dec. 17, 2019   (JP) .............................. JP2019-227587

(51) Int. Cl.
*G06K 9/46* (2006.01)
*G06K 9/52* (2006.01)
*G06K 9/00* (2022.01)

(52) U.S. Cl.
CPC ....... *G06K 9/4604* (2013.01); *G06K 9/00818* (2013.01); *G06K 9/4652* (2013.01); *G06K 9/52* (2013.01)

(58) Field of Classification Search
CPC ............. G06K 9/4604; G06K 9/00818; G06K 9/4652; G06K 9/52; G06K 9/3241
USPC ....................................................... 382/103
See application file for complete search history.

(56) References Cited

U.S. PATENT DOCUMENTS

| 2009/0263025 | A1* | 10/2009 | Li | G06K 9/522 |
| | | | | 382/203 |
| 2010/0067805 | A1* | 3/2010 | Klefenz | G06K 9/00818 |
| | | | | 382/201 |
| 2011/0188754 | A1* | 8/2011 | Leloglu | G06K 9/4633 |
| | | | | 382/180 |
| 2011/0234840 | A1* | 9/2011 | Klefenz | G06K 9/4633 |
| | | | | 348/222.1 |

(Continued)

FOREIGN PATENT DOCUMENTS

| JP | H09-114990 A | 5/1997 |
| JP | H09-178427 A | 7/1997 |

(Continued)

*Primary Examiner* — Ali Bayat
(74) *Attorney, Agent, or Firm* — Fujitsu Patent Center

(57) ABSTRACT

An image identification apparatus includes: a memory; and a processor coupled to the memory, the processor being configured to perform processing, the processing including: acquiring a contour image where pixels indicating a contour of a subject are extracted from an input image; detecting pixels of 3 points or more over the contour from each of regions in the contour image, which are separated by a predetermined distance in a vertical direction or a horizontal direction; calculating, for each combination of pixels of every 2 points among the detected pixels, an intersection point of a perpendicular bisector of a line segment having 2 points as end points and a distance between the intersection point and one of the detected pixels; and identifying, from the input image, a circle having the intersection point as a center of the circle and the distance as a radius.

10 Claims, 9 Drawing Sheets

(56) References Cited

U.S. PATENT DOCUMENTS

| | | | |
|---|---|---|---|
| 2012/0314939 A1* | 12/2012 | Hasegawa | G06K 9/62 382/159 |
| 2017/0193312 A1* | 7/2017 | Ai | G06F 13/20 |
| 2020/0043072 A1* | 2/2020 | Li | G06Q 30/0206 |
| 2020/0096454 A1* | 3/2020 | Konishi | G06T 7/001 |
| 2021/0043072 A1* | 2/2021 | Kusaka | G06T 7/60 |

FOREIGN PATENT DOCUMENTS

| | | |
|---|---|---|
| JP | H09-185703 A | 7/1997 |
| JP | 2008-287735 A | 11/2008 |

\* cited by examiner

IMAGE IDENTIFICATION APPARATUS, IMAGE IDENTIFICATION METHOD, AND NON-TRANSITORY COMPUTER-READABLE STORAGE MEDIUM FOR STORING IMAGE IDENTIFICATION PROGRAM

CROSS-REFERENCE TO RELATED APPLICATION

This application is based upon and claims the benefit of priority of the prior Japanese Patent Application No. 2019-227587, filed on Dec. 17, 2019, the entire contents of which are incorporated herein by reference.

FIELD

The embodiments discussed herein are related to an image identification apparatus, an image identification method, and a non-transitory computer-readable storage medium storing an image identification program.

BACKGROUND

In recent years, there has been an increasing demand for a safe driving support technique for an automobile. For example, a road sign, a signal, or the like is recognized from a video captured by an in-vehicle camera or the like. In order to recognize a round traffic sign or a signal, it is desirable to identify a circular portion from an input image.

As a method of identifying a circular shape, a method of using Hough transformation is known. In the Hough transformation, a circle is expressed by $r^2=(x-a)^2+(y-b)^2$ using a parameter r indicating a radius and parameters (a, b) indicating coordinates of a center of the circle. Then, edge detection is performed on the input image, all pixels are scanned using (a, b) and r as parameters, and if the pixels are over an edge, a score is given to a point in a Hough space having each of a, b, and r as an axis, and voting is performed so as to generate one curved surface. A point in the Hough space at which many votes are acquired is recognized as a pixel over a circumference of a center of the circle (a, b) and a radius r.

In addition, for example, a method of recognizing a sign based on an image captured by a color camera has been proposed. In this method, a color signal of an input image is converted into hue, saturation, and brightness information, a specific color of a sign is extracted from the input image to obtain an extracted image, and a shape of the extracted image is compared with a shape serving as a base to recognize the sign.

In addition, an image recognition method of recognizing a circle or an ellipse without being affected by noise or the like by obtaining a center thereof from edge information of the circle or the ellipse has been proposed. In this method, a candidate region of a target is extracted from a binary image signal, an edge of a circle or an ellipse in the candidate region is extracted, and a center thereof is calculated. Also, an inside of the candidate region is divided into meshes, the number of black pixels in each mesh is held in a memory 4, and feature quantity data is created in which mesh data over each circumference are arranged along a plurality of concentric circles from the center of the circle or the ellipse in the candidate region. Then, a rotation angle is detected by matching with the feature quantity data of a same radius in a dictionary, and an image is recognized based on a certainty of the rotation angle.

Further, there has been proposed an image position measuring method capable of detecting a center position of a circular target even when a pattern other than a circular target is captured in a captured image or when a part of the circular target is missing in the captured image. In this method, an edge portion between a target and other portions thereof is extracted from an image of the circular target, optional 3 points are selected from the extracted edge, and a center point of a circle predicted from position information of the 3 points is calculated. Then, target point extraction is executed for a plurality of extracted candidate points by collecting adjacent center position data, and finally the target point position is outputted as a result.

Further, a method of recognizing a signboard and a sign using a color image has been proposed. In this method, a range is divided into 3 by focusing on the hue in color information, and the signboard is extracted when saturation information exceeds a predetermined threshold value and a degree of circularity is a predetermined value in each divided region.

Examples of the related art include Japanese Laid-open Patent Publication No. 9-185703, Japanese Laid-open Patent Publication No. 9-114990, Japanese Laid-open Patent Publication No. 9-178427, and Japanese Laid-open Patent Publication No. 2008-287735.

SUMMARY

According to an aspect of the embodiments, an image identification apparatus includes: a memory; and a processor coupled to the memory, the processor being configured to perform processing, the processing including: acquiring a contour image where pixels indicating a contour of a subject are extracted from an input image; detecting pixels of 3 points or more over the contour from each of regions in the contour image, which are separated by a predetermined distance in a vertical direction or a horizontal direction; calculating, for each combination of pixels of every 2 points among the detected pixels, an intersection point of a perpendicular bisector of a line segment having 2 points as end points and a distance between the intersection point and one of the detected pixels; and identifying, from the input image, a circle having the intersection point as a center of the circle and the distance as a radius.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

However, the detection of a circular shape using the Hough transformation has a problem that an amount of computation is very large. In addition, in the above-described technique of the related art, it is desirable to obtain a center of gravity of the extracted image or to calculate the center of the circle using all points over the circumference, which increases the amount of computation.

According to an aspect of the embodiments, provided is a solution to reduce the amount of computation when a circular shape is identified from an image.

Hereinafter, an example of an embodiment according to a technique of the disclosure will be described with reference to the drawings. In the present embodiment, a case will be described in which a circular shape such as a round signal or a sign is identified from a video captured by an in-vehicle camera.

Figure 1:
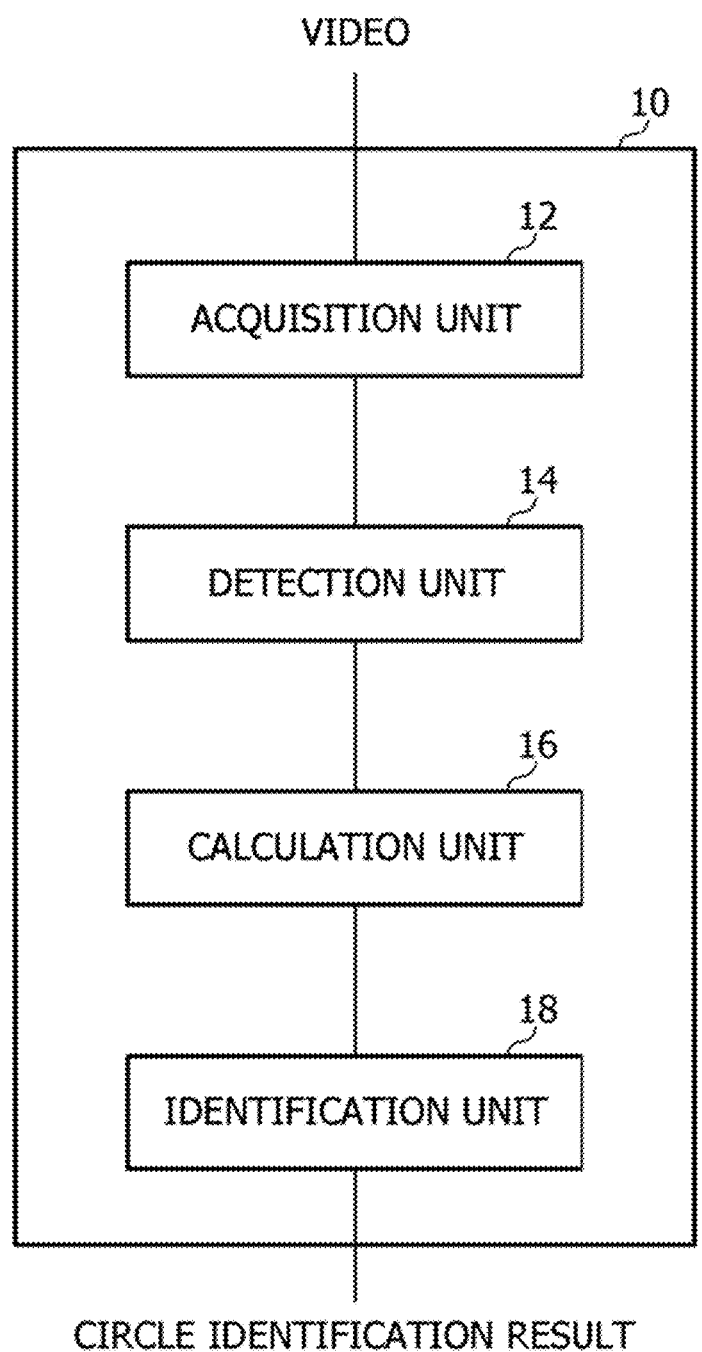
FIG. 1 is a functional block diagram of an image identification apparatus according to the present embodiment.

As illustrated in FIG. 1, the video captured by the in-vehicle camera is input into an image identification apparatus 10. The image identification apparatus 10 identifies a circular shape such as a signal or a sign from each frame image constituting a video, and outputs a circle identification result.

As Illustrated in FIG. 1, the image identification apparatus 10 functionally includes an acquisition unit 12, a detection unit 14, a calculation unit 16, and an identification unit 18.

The acquisition unit 12 acquires a contour image where pixels indicating a contour of a subject are extracted from each frame image of an input video. Specifically, the acquisition unit 12 acquires the contour image by extracting, from each frame image, pixels having color components indicating a circle of an identification target and binarizing the extracted pixels.

More specifically, the acquisition unit 12 converts a frame image, which is an image in a YUV color space or a RGB color space, into an image in an HSV color space. The acquisition unit 12 extracts, from the frame image converted into the image in the HSV color space, pixels of color components, such as red and blue, which are frequently included in a road sign and a signal, acquires a contour image in which the extracted pixels are black pixels and the other pixels thereof are white pixels, and stores the contour image in a predetermined storage area.

In the recognition of the road traffic sign or the signal, since a video captured outdoors is a processing target, pixels of color components of the target may be extracted with high accuracy by converting the YUV color space or the RGB color space into the HSV color space which is less affected by brightness of light than the YUV color space or the RGB color space.

The detection unit 14 detects pixels of 3 points or more over the contour from each of regions separated by predetermined distances in a vertical direction or a horizontal direction in the contour image. In the present embodiment, a case where pixels of 4 points are detected will be described.

Figure 2:
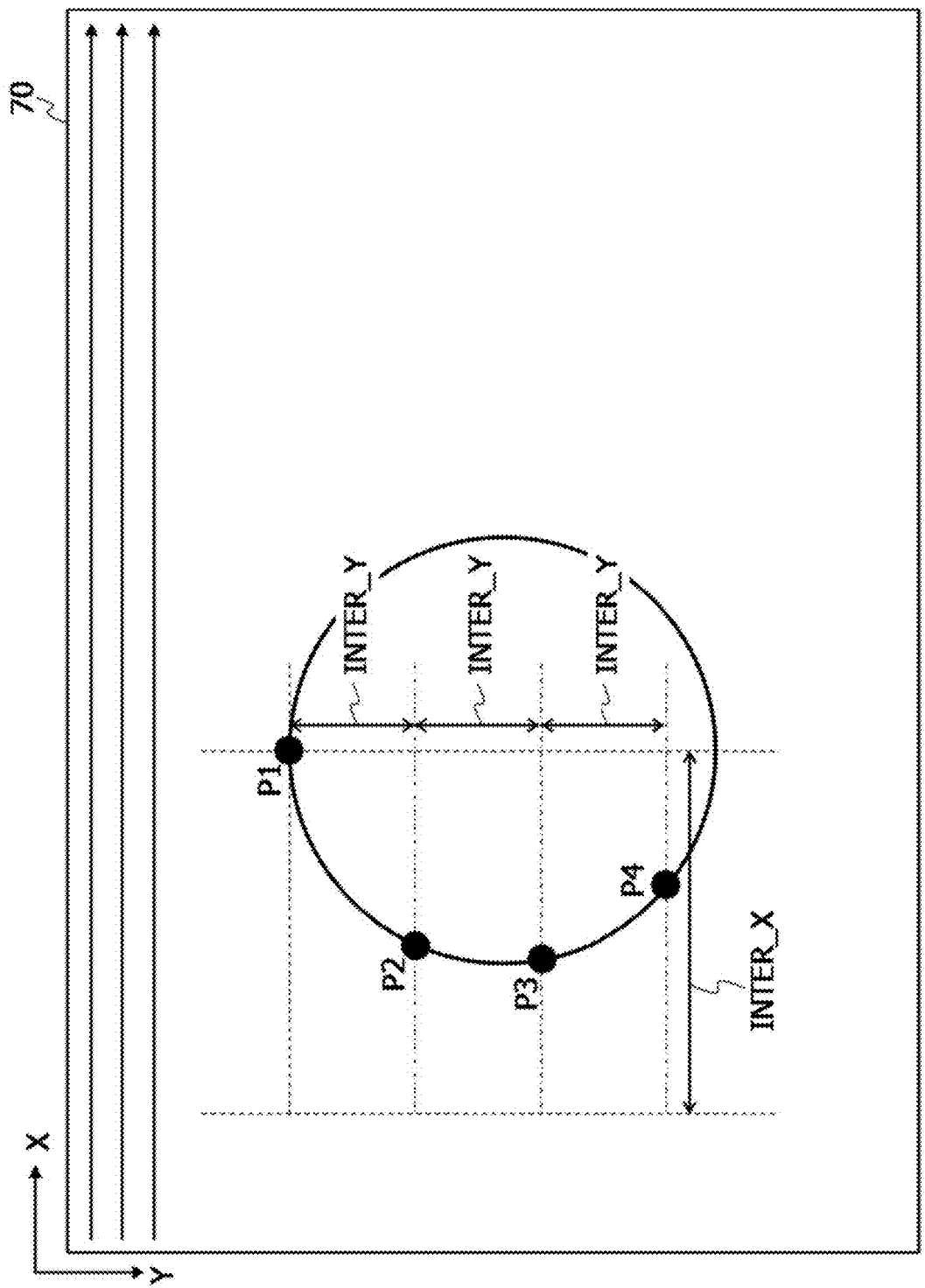
FIG. 2 is a diagram for explaining detection of pixels over a contour.

Specifically, as illustrated in FIG. 2, the detection unit 14 searches for pixels over the contour in a raster scan order from a contour image 70 acquired by the acquisition unit 12, and detects the searched pixel over the contour as a pixel P1 serving as a reference point. The detection unit 14 detects pixels (P2, P3, and P4) over the contours of the other 3 points in a region in which a distance in the horizontal direction (X-axis direction) to the pixel P1 is within a predetermined range for each line in which a distance in the vertical direction (Y-axis direction) to the pixel P1 is a predetermined distance (INTER_Y) interval. The predetermined range in the horizontal direction is a range from x−INTER_X to x, where an X coordinate of the pixel P1 is x and a predetermined distance is INTER_X.

A value of INTER_Y is set such that a minimum value is 2 pixels and a maximum value is ⅓ of a diameter of a circle of the identification target, considering that at least 3 points are expected to identify one circular shape. In addition, when a partially missing circle is also the identification target, for example, it is desirable to set the value of INTER_Y small, such as making it smaller than an intermediate value between the minimum value and the maximum value. In addition, if the value of INTER_X is too small, detection omission occurs, and if the value of INTER_X is too large, an amount of computation increases. Therefore, an appropriate value is determined based on the diameter of the circle of the identification target.

The calculation unit 16 calculates an intersection point of a perpendicular bisector of a line segment having 2 points as end points for each combination of pixels of every 2 points among the pixels P1 to P3 detected by the detection unit 14. This is because coordinates of a center of a circle passing through 3 points are obtained by using a fact that the center of the circle is an intersection point of the perpendicular bisector.

Figure 3:
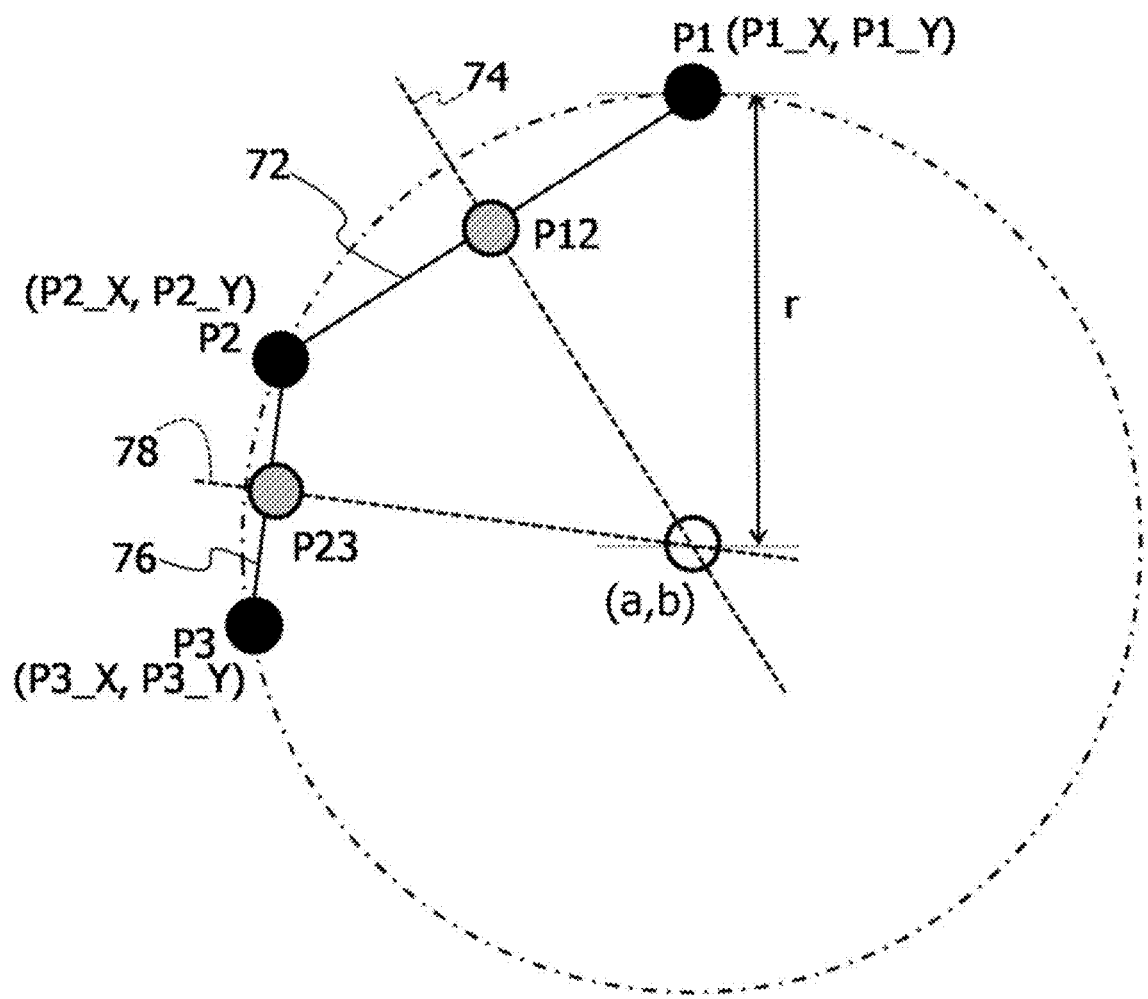
FIG. 3 is a diagram for explaining calculation of coordinates of a center of a circle.

Specifically, as illustrated in FIG. 3, the coordinates of the pixel P1 are (P1_X, P1_Y), the coordinates of the pixel P2 are (P2_X, P2_Y), the coordinates of the pixel P3 are (P3_X, P3_Y), and the coordinates of the center of the circle are (a, b). The calculation unit 16 calculates an inclination T12 of a line segment 72 having P1 and P2 as end points and the coordinates of the center point P12 of the line segment 72 as follows.

$$T12 = (P2\_Y - P1\_Y)/(P2\_X - P1\_X)$$

$$P12\_X = (P1\_X + P2\_X)/2$$

$$P12\_Y = (P1\_Y + P2\_Y)/2$$

In addition, the calculation unit 16 calculates an inclination TA of a perpendicular bisector 74 of the line segment 72 as follows.

$$TA = -1/T12$$

The calculation unit 16 establishes an equation of a straight line passing through the pixel P12 and the center of the circle as illustrated in the following equation (1).

$$b = TA*a + m \qquad (1)$$

The calculation unit 16 substitutes the coordinates of the pixel P12 into the above equation as illustrated below to obtain a constant m as illustrated in the following equation (2).

$$P12\_Y = TA*P12\_X + m$$

$$m = P12\_Y - TA*P12\_X \qquad (2)$$

Similarly, the calculation unit 16 calculates an inclination TB of the line segment 76 having the pixel P2 and the pixel P3 as end points and the coordinates of a center point P23 of a line segment 76, and establishes an equation of a straight line passing through the pixel P23 and the center of the circle as illustrated below.

$$b = TB*a + n \quad (3)$$

The calculation unit 16 substitutes the coordinates of the pixel P23 into the above equation as illustrated below to obtain a constant n as illustrated in the following equation (4).

$$P23\_Y = TB*P23\_X + n$$

$$n = P23\_Y - TB*P23\_X \quad (4)$$

The calculation unit 16 calculates the coordinates (a, b) of the center of the circle by substituting the equation (3) and the equation (4) into the equation (1) and the equation (2) and solving the 2 equations.

In addition, the calculation unit 16 calculates the distance between the center of the circle and one (for example, the pixel P1) of the pixels P1 to P3 as the radius r.

The identification unit 18 identifies a circle represented by the coordinates (a, b) of the center of the circle calculated by the calculation unit 16 and the radius r from the frame image. The identification unit 18 identifies the identified circle as a circle of the target which is finally output as a circle identification result when a difference between the distance between a pixel other than the pixels used for the calculation of the coordinates of the center of the circle by the calculation unit 16, among the pixels detected by the detection unit 14 and the center of the circle, and the radius is equal to or less than a predetermined threshold value. If the distance between a pixel other than the pixel used for the calculation of the coordinates of the center of the circle and the center of the circle substantially coincides with the radius, the pixel may be regarded as a point over the identified circle, and it may be said that there is a high probability that the pixel is an appropriately identified circle rather than an erroneous identification. For example, the appropriateness of the identified circle is determined by using the pixel other than the pixels used for the calculation of the coordinates of the center of the circle.

Figure 4:
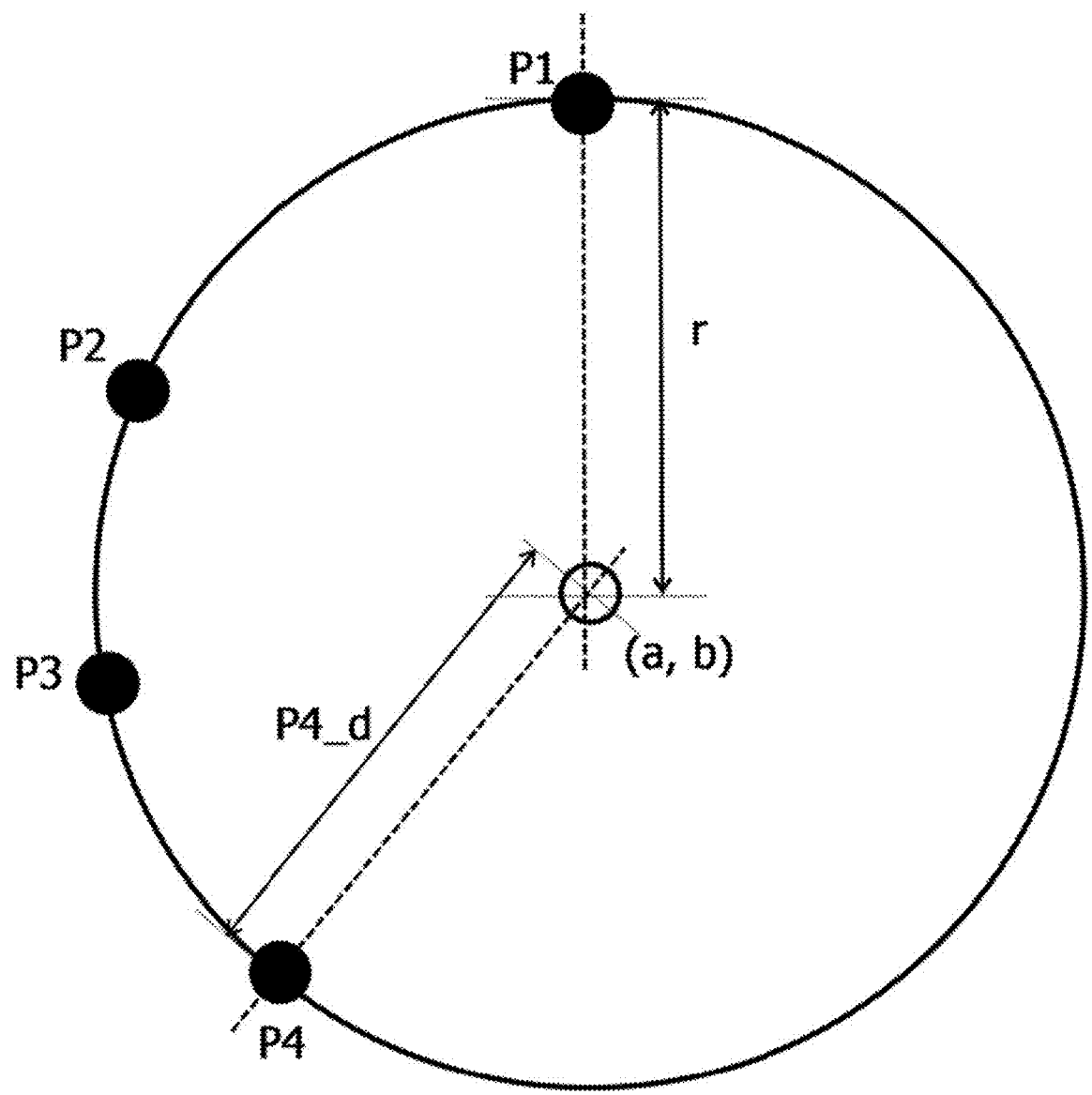
FIG. 4 is a diagram for explaining determination of appropriateness of an identified circle.

For example, as described above, in a case where the pixels P1 to P4 are detected and the coordinates of the center of the circle are calculated using the pixels P1 to P3, as illustrated in FIG. 4, the distance between the pixel P4 and the center of the circle is denoted by P4_d, and a threshold value is denoted by α. In this case, if |P4_d−r|≤α, the identification unit 18 identifies a circle represented by the coordinates (a, b) of the center of the circle calculated by the calculation unit 16 and the radius r from the frame image.

The identification unit 18 outputs the coordinates (a, b) of the center of the circle and the value of the radius r as the circle identification result. The output circle identification result may be superimposed and displayed over a video captured by the in-vehicle camera, or may be input into another system such as a system for recognizing a sign, a signal, or the like.

Figure 5:
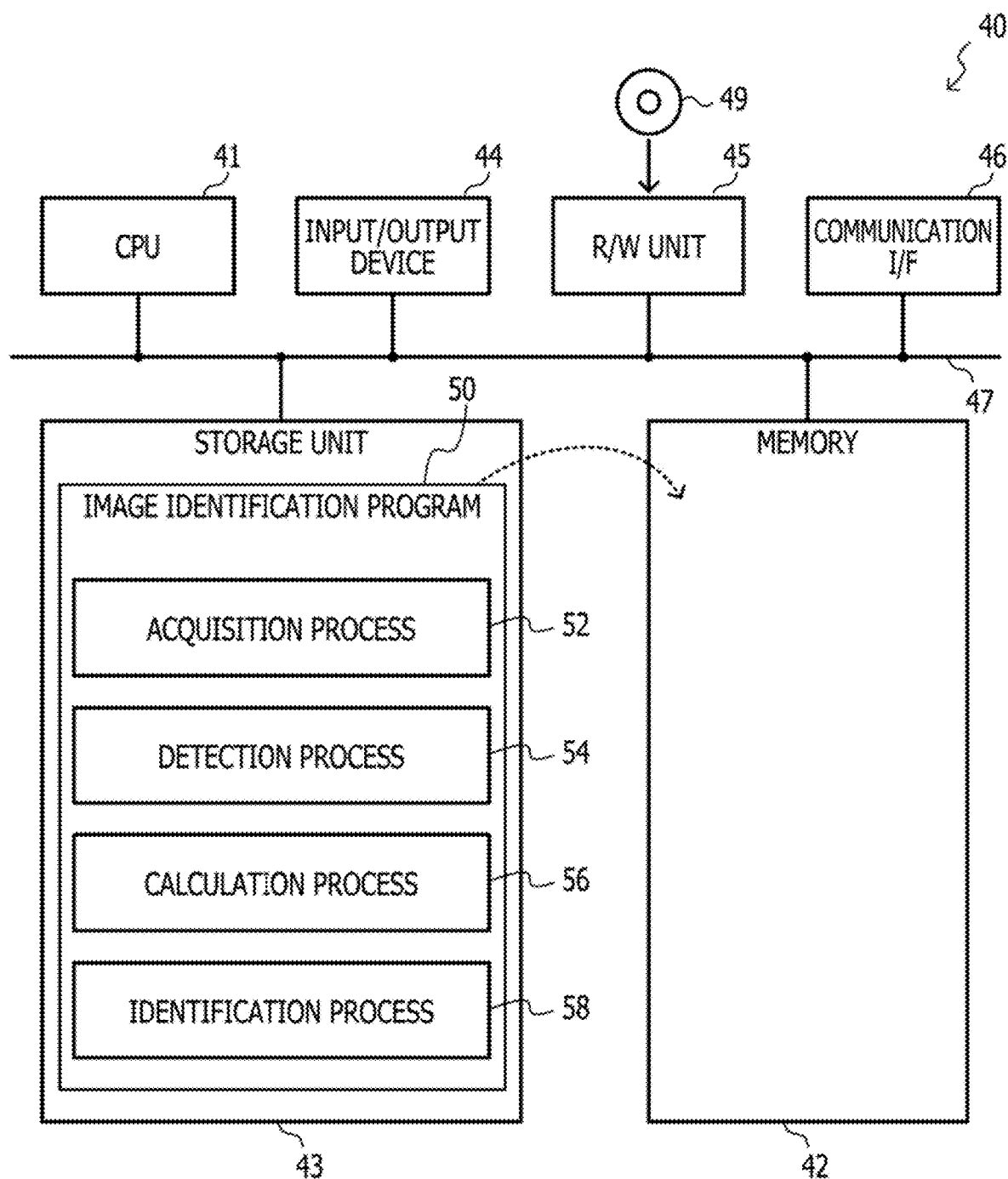
FIG. 5 is a block diagram illustrating a schematic configuration of a computer functioning as an image identification apparatus according to the present embodiment.

The image identification apparatus 10 may be implemented by a computer 40 illustrated in, for example, FIG. 5. The computer 40 includes a central processing unit (CPU) 41, a memory 42 serving as a temporary storage area, and a nonvolatile storage unit 43. In addition, the computer 40 also includes an input/output device 44 such as an input unit and a display unit, and a read/write (R/W) unit 45 that controls reading and writing of data from and to a storage medium 49. In addition, the computer 40 also includes a communication interface (I/F) 46 that is coupled to a network such as the Internet. The CPU 41, the memory 42, the storage unit 43, the input/output device 44, the R/W unit 45, and the communication I/F 46 are coupled to each other via a bus 47.

The storage unit 43 may be implemented by a hard disk drive (HDD), a solid-state drive (SSD), a flash memory, or the like. The storage unit 43 serving as a storage medium stores an image identification program 50 for causing the computer 40 to function as the image identification apparatus 10. The image identification program 50 includes an acquisition process 52, a detection process 54, a calculation process 56, and an identification process 58.

The CPU 41 reads the image identification program 50 from the storage unit 43, develops the image identification program 50 in the memory 42, and sequentially executes processes included in the image identification program 50. The CPU 41 operates as the acquisition unit 12 illustrated in FIG. 1 by executing the acquisition process 52. In addition, the CPU 41 operates as the detection unit 14 illustrated in FIG. 1 by executing the detection process 54. In addition, the CPU 41 operates as the calculation unit 16 illustrated in FIG. 1 by executing the calculation process 56. In addition, the CPU 41 operates as the identification unit 18 illustrated in FIG. 1 by executing the identification process 58. Thus, the computer 40 executing the image identification program 50 functions as the image identification apparatus 10. The CPU 41 that executes a program is hardware.

The function implemented by the image identification program 50 may also be implemented by, for example, a semiconductor integrated circuit, more specifically, an application-specific integrated circuit (ASIC) or the like.

Figure 6:
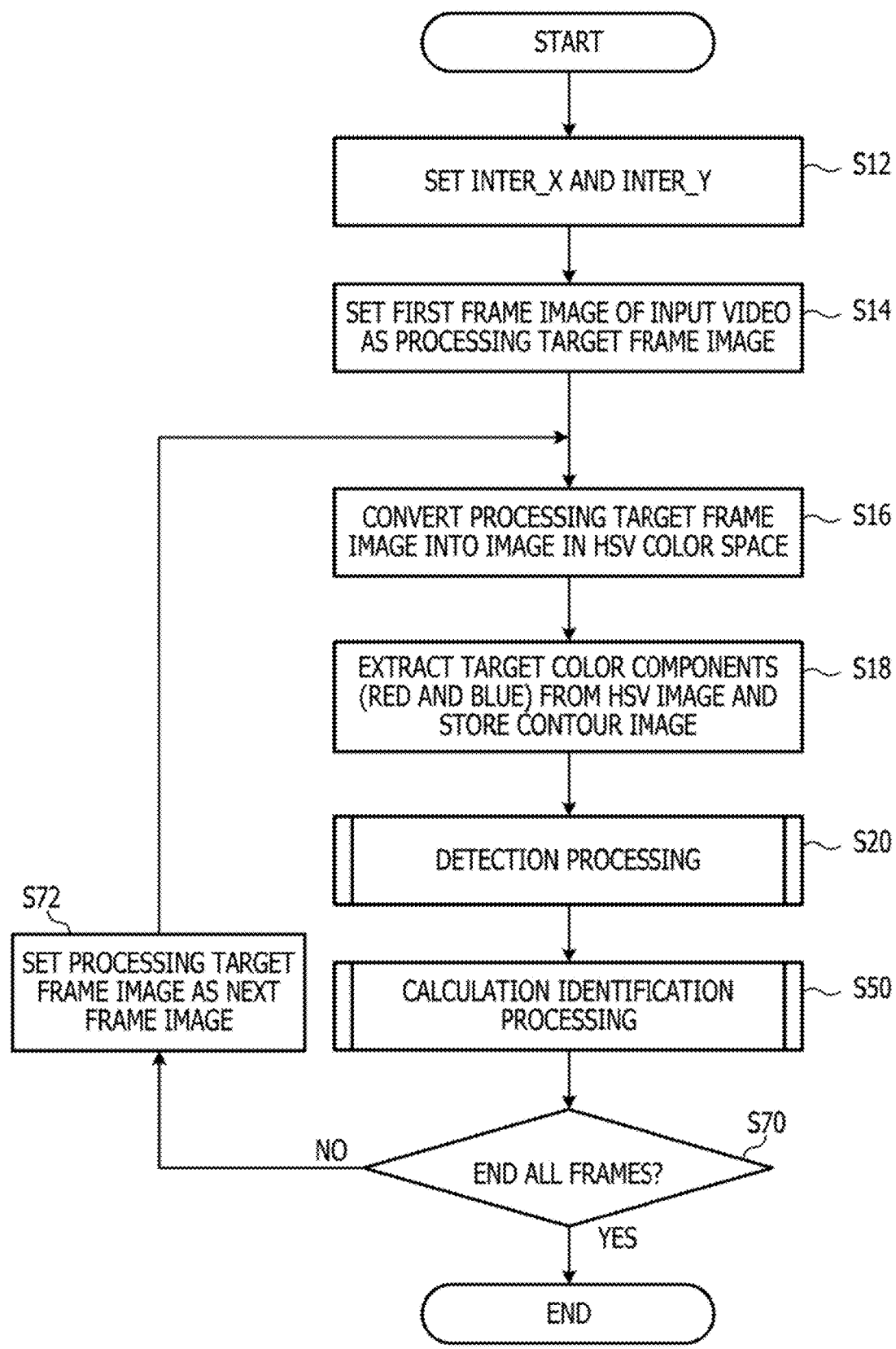
FIG. 6 is a flowchart illustrating an example of image identification processing in the present embodiment.

Next, an operation of the image identification apparatus 10 according to the present embodiment will be described. When an input of the video captured by the in-vehicle camera into the image identification apparatus 10 is started, the image identification processing illustrated in FIG. 6 is executed in the image identification apparatus 10. The image identification processing is an example of an image identification method of the technique of the disclosure.

In step S12, the detection unit 14 sets values of INTER_X and INTER_Y input by a user. For example, values such as INTER_X=30 (pixels) and INTER_Y=5 (pixels) are set.

Next, in step S14, the acquisition unit 12 sets a first frame image of the video input into the image identification apparatus 10 as a processing target frame image.

Next, in step S16, the acquisition unit 12 converts the frame image, which is an image in the YUV color space or the RGB color space, into an image in the HSV color space.

Next, in step S18, the acquisition unit 12 extracts pixels of color components, such as red and blue, which are frequently included in a road sign and a signal, from the processing target frame image converted into the image in the HSV color space. Then, the acquisition unit 12 acquires a contour image in which the extracted pixels are black pixels and the other pixels thereof are white pixels, and stores the contour image in a predetermined storage area.

Next, in step S20, detection processing is executed. Here, the detection processing will be described with reference to FIG. 7.

In step S22, the detection unit 14 sets a first pixel (for example, a pixel at an upper left corner) of the contour image acquired from the processing target frame image as the processing target pixel (x, y).

Next, in step S24, the detection unit 14 determines whether or not the processing target pixel (x, y) is the black pixel. In the case of the black pixel, the process proceeds to step S28, and in the case of the white pixel, the process proceeds to step S26.

In step S26, the detection unit 14 sets the next pixel in the raster scan order as the processing target pixel, and the process returns to step S24. On the other hand, in step S28, the detection unit 14 detects the processing target pixel (x, y) as the pixel P1 serving as the reference point.

Figure 8:
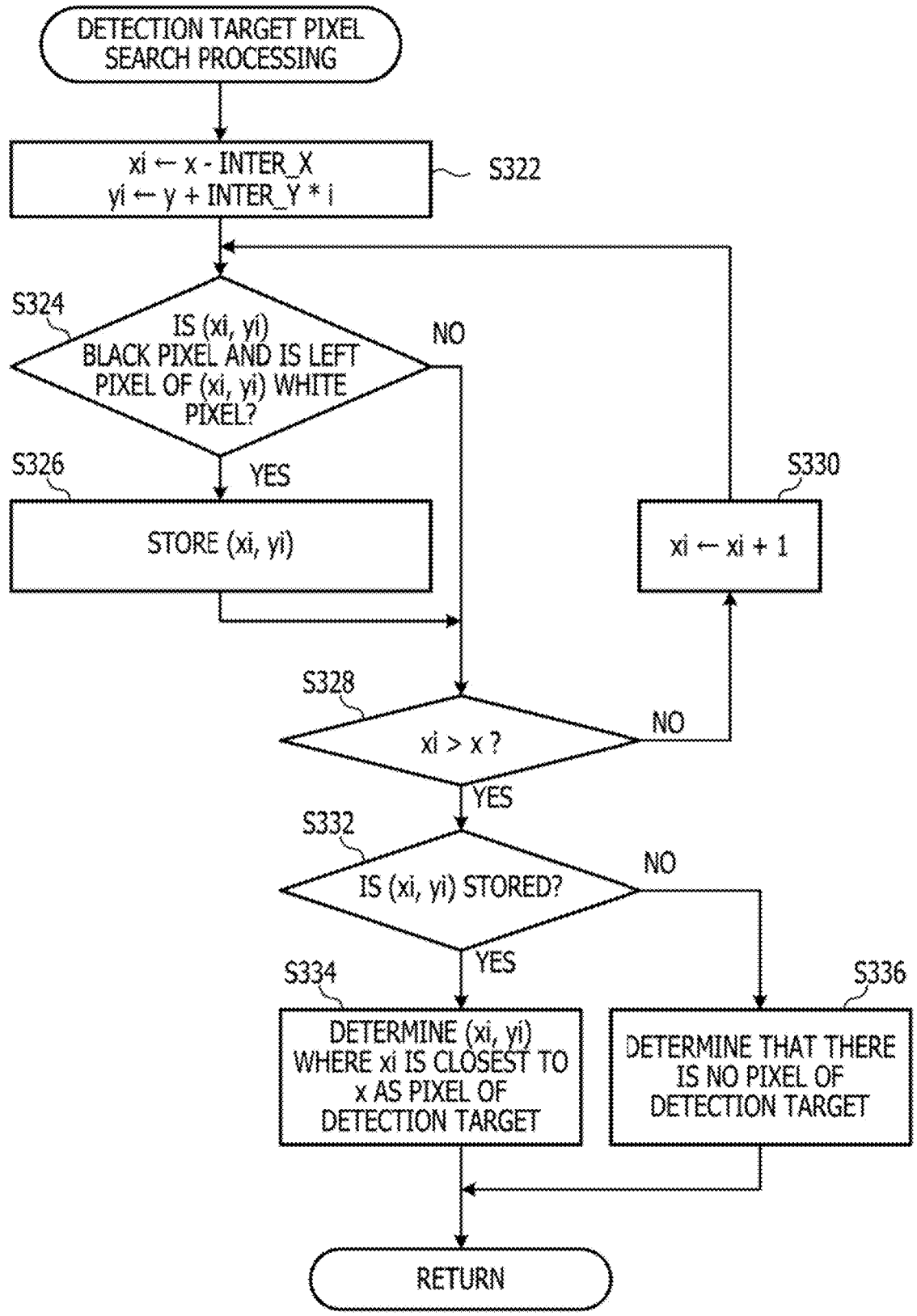
FIG. 8 is a flowchart illustrating an example of detection target pixel search processing.

Next, in step S30, the detection unit 14 sets a variable i as 1. Then, in the next step S32, detection target pixel search processing is executed. Here, the detection target pixel search processing will be described with reference to FIG. 8.

In step S322, the detection unit 14 sets a search pixel (xi, yi) as (x−INTER_X, y+INTER_Y*i).

Next, in step S324, the detection unit 14 determines whether or not the search pixel (xi, yi) is the black pixel and a left adjacent pixel (xi−1, yi) is the white pixel. In a case of an affirmative determination, the process proceeds to step S326, and in a case of a negative determination, the process proceeds to step S328.

In step S326, the detection unit 14 temporarily stores a coordinate value of the search pixel (xi, yi) in a predetermined storage area, and the process proceeds to step S328.

In step S328, the detection unit 14 determines whether or not xi exceeds x. When xi≤x, the process proceeds to step S330, the detection unit 14 moves the search pixel to a right adjacent pixel, and the process returns to step S324. When xi>x, the process proceeds to step S332.

In step S332, the detection unit 14 determines whether or not the coordinate value of the search pixel (xi, yi) is stored in a predetermined storage area. If the coordinate value is stored, the process proceeds to step S334, and if the coordinate value is not stored, the process proceeds to step S336.

Figure 7:
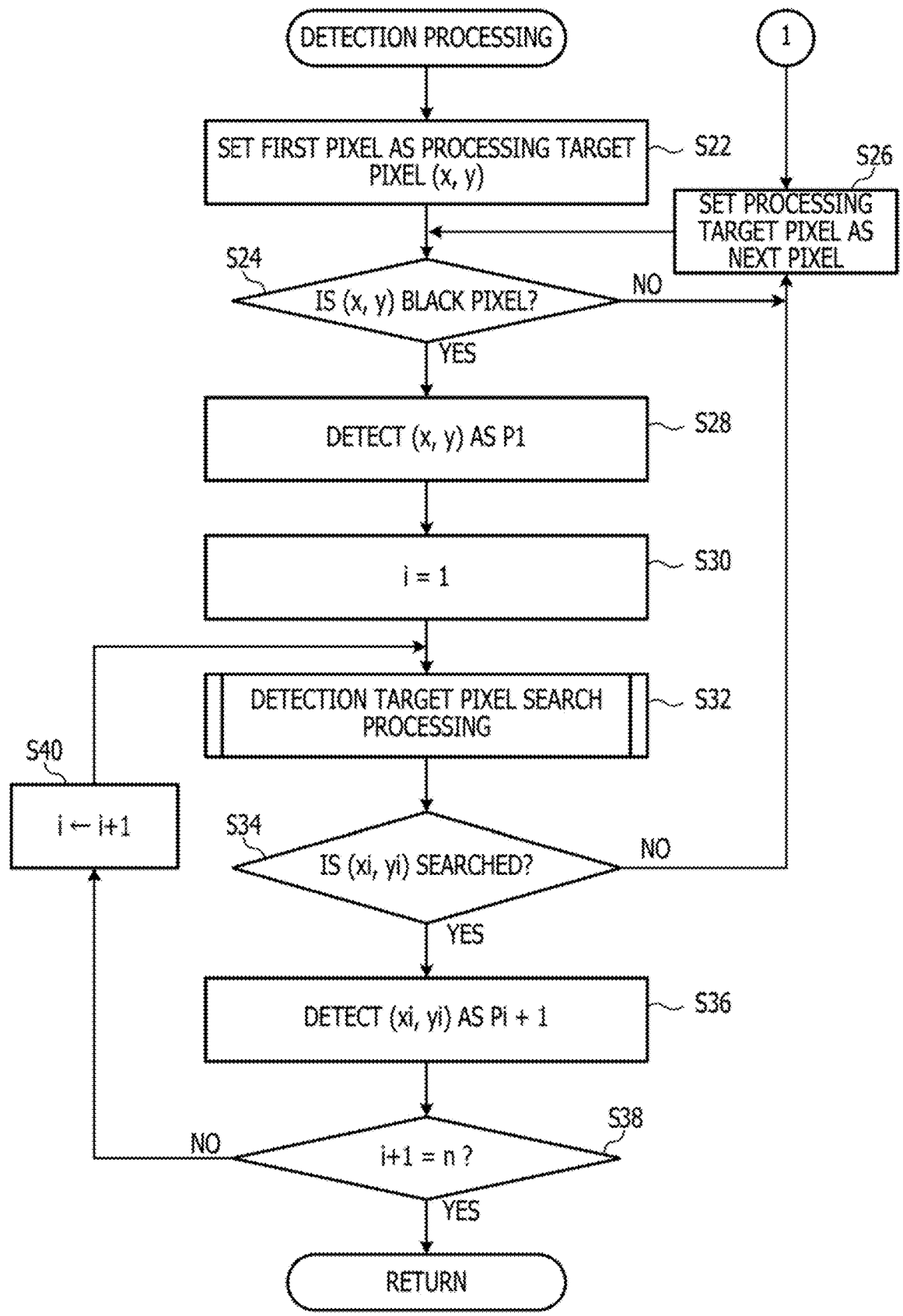
FIG. 7 is a flowchart illustrating an example of detection processing.

In step S334, the detection unit 14 determines, as the pixel of the detection target, a pixel having the coordinate value (xi, yi) in which the X coordinate (xi) is closest to the X coordinate (x) of the pixel P1 among coordinate values stored in the predetermined storage area. On the other hand, in step S336, the detection unit 14 determines there is no pixel of the detection target. Then, the process returns to the detection processing (FIG. 7).

Next, in step S34 of the detection processing (FIG. 7), the detection unit 14 determines whether or not the search pixel (xi, yi) is searched by the detection target pixel search processing in step S32. When it is determined that the search pixel (xi, yi) is the pixel of the detection target, the process proceeds to step S36, and when it is determined that there is no pixel of the detection target, the process proceeds to step S26.

In step S36, the detection unit 14 detects the search pixel (xi, yi) as a pixel P$i$+1.

Next, in step S38, the detection unit 14 determines whether or not i+1 is the number n of pixels to be detected. If i+1=n, the process returns to the image identification processing (FIG. 6). When i+1<n, the process proceeds to step S40, the detection unit 14 increments i by 1, and the process returns to step S32.

Figure 9:
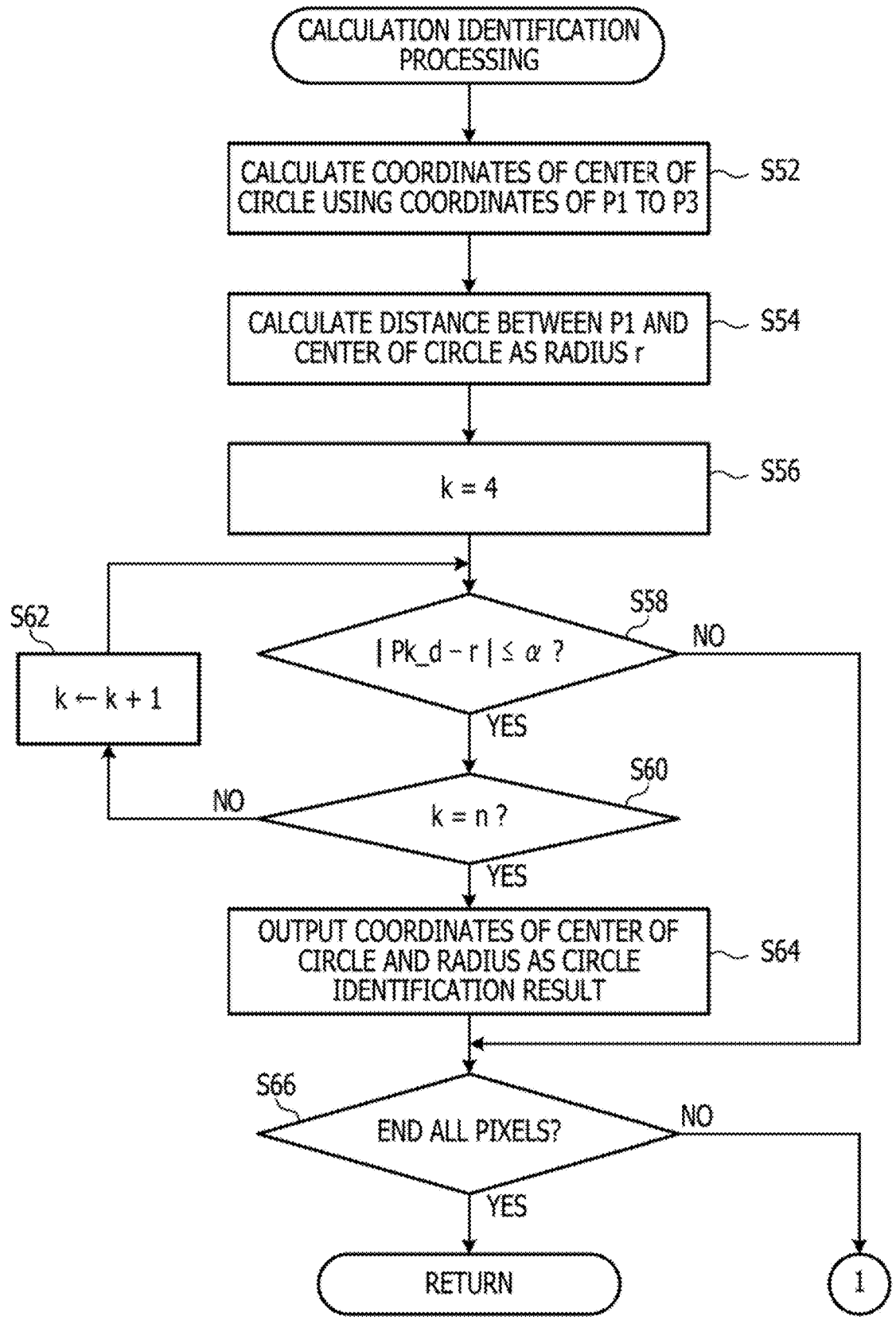
FIG. 9 is a flowchart illustrating an example of calculation identification processing.

Next, in step S50 of the image identification processing (FIG. 6), calculation identification processing is executed. Here, the calculation identification processing will be described with reference to FIG. 9.

In step S52, the calculation unit 16 calculates, as the coordinates (a, b) of the center of the circle, the intersection point of the perpendicular bisector of the line segment having the 2 points as the end points, for each combination of pixels of every 2 points among the pixels P1 to P3 detected by the detection unit 14.

Next, in step S54, the calculation unit 16 calculates the distance between the center of the circle and one (for example, the pixel P1) of the pixels P1 to P3 as the radius r.

Next, in step S56, the identification unit 18 sets 4 to a variable k. Next, in step S58, the identification unit 18 determines whether or not a difference between a distance Pk_d between a pixel Pk and the center of the circle, and the radius r is equal to or less than a threshold value α. When |P4_$d$−r|≤α, the process proceeds to step S60, and when |P4_$d$−r|>α, the process proceeds to step S66.

In step S60, the identification unit 18 determines whether or not the variable k is equal to the number n of detected pixels. When k=n, the process proceeds to step S64. When k<n, the process proceeds to step S62, the identification unit 18 increments k by 1, and the process returns to step S58.

In step S64, the identification unit 18 outputs the coordinates (a, b) of the center of the circle and the value of the radius r as circle identification results.

Next, in step S66, the identification unit 18 determines whether or not all the pixels of the processing target frame image are set as the processing target pixels and the process is ended. When there is an unprocessed pixel, the process proceeds to step S26 of the detection processing (FIG. 7), and when the process is ended for all the pixels, the process returns to the image identification processing (FIG. 6).

Next, in step S70 of the image identification processing (FIG. 6), the acquisition unit 12 determines whether or not all frame images of the input video are set as the processing target frame images and the process is ended. When there is an unprocessed frame image, the process proceeds to step S72, the acquisition unit 12 sets the next frame image as the processing target frame image, and the process returns to step S16. When for all the frame images, the process is ended, the image identification processing ends.

As described above, the image identification apparatus according to the present embodiment detects pixels of 3 points or more over the contour from each of regions separated by predetermined distances in the vertical direction or the horizontal direction in the contour image. Then, for each combination of pixels of every 2 points among the detected pixels, a circle is identified, in which an intersection point of the perpendicular bisector of the line segment having 2 points as end points is a center of the circle and a distance between the center of the circle and one of the detected pixels is a radius. Therefore, the amount of computation may be reduced when the circular shape is identified from the image.

Further, when pixels of 4 points or more are detected from the image, the appropriateness of the circle to be identified is determined based on the difference between the distance between the pixel other than the pixels used for calculating the center of the circle and the center of the circle, and the radius. Therefore, erroneous identification is avoided and the circular shape may be identified from the image with high accuracy.

In addition, by using, as the contour image, an image obtained by extracting pixels of the color components of the identification target from the image in the HSV color space and binarizing the extracted pixels, it is possible to acquire a contour image in which a contour including a circular shape of the identification target is extracted with high accuracy. Therefore, the circular shape may be identified from the image with high accuracy.

In the above-described technique of the related art for comparing the extracted image with a basic shape, it is desirable to obtain the center of gravity of the shape of the extracted image, which increases the amount of computation. Further, in the technique of the related art using the feature quantity data in which the mesh data are arranged over the circumference, since the center of the circle is calculated by using all the points over the circumference, the amount of computation increases. In addition, in the related art in which the center point of the circle is calculated from the position information of 3 points selected from an extracted edge, it is desirable to input a known radius in advance, and it is not possible to apply the related art to a case where the radius is unknown. In addition, in the related art that uses the degree of circularity in each of the divided regions obtained by performing division by focusing on the hue, it is desirable to hold image data for 1 screen in a memory in order to calculate the degree of circularity.

In view of the above-described problems of the related art, the effects of the present embodiment will be described more specifically in terms of the amount of computation and an amount of memory consumption.

In the circle identification method using the Hough transformation, edge detection is performed on an input image (W*H), and a distance from each pixel of the edge to all coordinates of the center of the circle is calculated as a radius. Therefore, the amount of computation is O (W*H*W*H), which is very large.

Further, in order to store the coordinates of the center of the circle and the radius by a three dimensional counter, a memory of (W*H*the number of bits for storing the maximum radius of the circle of the identification target) is demanded.

According to the method of the present embodiment, the amount of computation may be reduced to O (W*H*3*INTER_X). For example, in a case of INTER_X=30 in a FULL HD image, the amount of computation is changed from O (1920*1080*1920*1080) to O (1920*1080*3*30), which may be reduced by 99%.

Regarding the amount of memory consumption, when a circle having a maximum radius of 50 pixels is detected in the FULL HD image, the method of the related art demands a total of 3.96 MB memories including a monochrome image holding memory (1 byte*1920*1080=1.98 MB) after edge detection is performed and a 3 dimensional counter (1 byte*1920*1080=1.98 MB) desirable for voting. The method of the present embodiment expects an image holding memory (1 byte*1920*1080=1.98 MB) after color space conversion and after contour extraction. Further, a memory (1 byte*1920*100=0.18 MB) for holding 1920 pixels*100 lines is expected for the detection processing of the pixels over the contour. For example, a memory of 2.16 MB is expected in total, and the amount of memory consumption may be reduced by 45.5% as compared with the method of the related art.

Since the amount of computation may be reduced, a processing time for identifying a circle may be greatly reduced, and the processing for recognizing a sign and a signal may be performed with high speed. In addition, since the amount of memory consumption may be reduced, in a case where the image identification apparatus according to the present embodiment is incorporated in an in-vehicle camera or a surveillance camera, the cost of the camera may be reduced. In addition, in a case where the in-vehicle camera and the image identification apparatus according to the present embodiment are configured as an in-vehicle apparatus, the cost of the in-vehicle apparatus may be similarly reduced. Furthermore, the image identification apparatus according to the present embodiment may be disposed over a cloud, and circle identification processing may be performed on a video transferred from a camera. Also in this case, the cost of the image identification apparatus configured over the cloud may be reduced.

In a system configured of a camera and a server over a cloud, a part of the functional units of the image identification apparatus according to the present embodiment may be incorporated in the camera or may be configured as an information processing apparatus that operates together with the camera, and other functional units may be configured as the server over the cloud. For example, similarly to the effect of reducing the amount of memory consumption described above, by disposing the acquisition unit and the detection unit on a camera side and disposing the calculation unit and the identification unit on a server side, bandwidth compression may be suppressed when data is transferred from the camera to the server.

Further, in the above-described embodiment, a case where the pixels of 4 points over the contour are detected is described, but in order to calculate the coordinates of the center of the circle and radius, at least pixels of 3 points may be detected.

Further, the number of pixels used for determining the appropriateness of the calculated coordinates of the center of the circle and radius is not limited to 1 point (pixel of fourth point) as in the above embodiment. Pixels of 2 points or more may be used for the determination of appropriateness. However, if the number of pixels used for the determination of appropriateness is too large, the amount of computation for the detection processing of the pixel increases, and there may be a problem such as the processing is interrupted when a part of the circle is missing and an undetectable pixel occurs. Even if the number of pixels used for the determination of appropriateness is 1 point or 2 points, it may sufficiently contribute to the improvement of identification accuracy.

In addition, in the above-described embodiment, a case is described in which an image obtained by extracting color components of the target from an image converted in the HSV color space and binarizing the extracted color components of the target is used as a contour image. However, the present disclosure is not limited thereto. A contour image acquired by general edge detection may be used.

In addition, in the above-described embodiment, a case is described in which the circular shape of the sign, the signal, or the like is identified from the video captured by the in-vehicle camera. However, the present disclosure is not limited thereto. For example, the present disclosure may be applied to other applications such as identifying a manhole from an image of a road captured from the sky.

In addition, in the above-described embodiment, although an embodiment is described in which the image identification program is stored (installed) in the storage unit in advance, the present disclosure is not limited thereto. The program according to the technique of the disclosure is able to be provided in a form stored in a storage medium such as a compact disc read-only memory (CD-ROM), a Digital Versatile Disc (DVD)-ROM, or a Universal Serial Bus (USB) memory.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a illustrating of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An image identification apparatus comprising:
    a memory; and
    a processor coupled to the memory, the processor being configured to perform processing, the processing including:
    acquiring a contour image where pixels indicating a contour of a subject are extracted from an input image;
    detecting pixels of 3 points or more over the contour from each of regions in the contour image, which are separated by a predetermined distance in a vertical direction or a horizontal direction;
    calculating, for each combination of pixels of every 2 points among the detected pixels, an intersection point of a perpendicular bisector of a line segment having 2 points as end points and a distance between the intersection point and one of the detected pixels; and
    identifying, from the input image, a circle having the intersection point as a center of the circle and the distance as a radius.

2. The image identification apparatus according to claim 1, wherein
    the detecting of pixels is configured to detect pixels of 4 points or more,
    the calculating of the intersection point is configured to calculate the intersection point by using 3 points among the pixels of 4 points or more, and
    the identifying of the circle is configured to determine that the circle is identified from the input image, when a difference between a distance between a pixel other than pixels used for the calculation of the intersection point by the calculation processing, among the pixels detected by the detection processing and the intersection point, and the radius is equal to or less than a predetermined threshold value.

3. The image identification apparatus according to claim 1, wherein
    the detecting of pixels is configured to:
    detect a pixel that is a reference point over the contour in a raster scan order from the contour image; and
    detect pixels of other 2 or more for every line in which a distance in the vertical direction from the reference point is equal to a predetermined distance interval.

4. The image identification apparatus according to claim 3, wherein
    a minimum value of the predetermined distance interval is set to 2 pixels, and a maximum value of the predetermined distance interval is set to ⅓ of a diameter of a circle of an identification target.

5. The image identification apparatus according to claim 4, wherein
    when a circle of which a part is missed is an identification target, the predetermined distance interval is set to a value smaller than an intermediate value between the minimum value and the maximum value.

6. The image identification apparatus according to claim 3, wherein
    the detecting of pixels is configured to detect pixels, in which a distance in the horizontal direction from the reference point is within a predetermined range, as the pixels of other 2 points or more.

7. The image identification apparatus according to claim 6, wherein
    the predetermined range is determined based on a diameter of a circle of an identification target.

8. The image identification apparatus according to claim 1, wherein
    the acquiring of the contour image is configured to acquire the contour image by extracting, from the input image, pixels having color components indicating a circle of an identification target, and binarizing the extracted pixels.

9. An image identification method in which processing is performed by a computer, the method comprising:
    acquiring a contour image where pixels indicating a contour of a subject are extracted from an input image;
    detecting pixels of 3 points or more over the contour from each of regions in the contour image, which are separated by a predetermined distance in a vertical direction or a horizontal direction;
    calculating, for each combination of pixels of every 2 points among the detected pixels, an intersection point of a perpendicular bisector of a line segment having 2 points as end points and a distance between the intersection point and one of the detected pixels; and
    identifying, from the input image, a circle having the intersection point as a center of the circle and the distance as a radius.

10. An image identification program stored in a non-transitory storage medium causing a computer to execute a process, the process comprising:
    acquiring a contour image where pixels indicating a contour of a subject are extracted from an input image;
    detecting pixels of 3 points or more over the contour from each of regions in the contour image, which are separated by a predetermined distance in a vertical direction or a horizontal direction;
    calculating, for each combination of pixels of every 2 points among the detected pixels, an intersection point of a perpendicular bisector of a line segment having 2 points as end points and a distance between the intersection point and one of the detected pixels; and
    identifying, from the input image, a circle having the intersection point as a center of the circle and the distance as a radius.

* * * * *